United States Patent
Hu et al.

(10) Patent No.: US 12,246,837 B2
(45) Date of Patent: Mar. 11, 2025

(54) ANTIMICROBIAL SURFACE TREATMENT SYSTEMS AND METHODS FOR AIRCRAFT FAUCETS

(71) Applicant: GOODRICH CORPORATION, Charlotte, NC (US)

(72) Inventors: Jin Hu, Hudson, OH (US); Phi Doan, Lewisville, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 618 days.

(21) Appl. No.: 17/529,443

(22) Filed: Nov. 18, 2021

(65) Prior Publication Data

US 2022/0194588 A1 Jun. 23, 2022

Related U.S. Application Data (60) Provisional application No. 63/127,784, filed on Dec. 18, 2020.

(51) Int. Cl.
*B64D 11/02* (2006.01)
*A01N 33/12* (2006.01)
*B05D 3/02* (2006.01)
*B05D 3/10* (2006.01)
*B05D 5/00* (2006.01)
*C23C 22/50* (2006.01)
*C23G 1/08* (2006.01)
*E03C 1/084* (2006.01)

(52) U.S. Cl.
CPC .............. *B64D 11/02* (2013.01); *A01N 33/12* (2013.01); *B05D 3/0272* (2013.01); *B05D 3/102* (2013.01); *B05D 5/00* (2013.01); *C23C 22/50* (2013.01); *C23G 1/081* (2013.01); *B05D 2202/15* (2013.01); *E03C 1/084* (2013.01)

(58) Field of Classification Search
None
See application file for complete search history.

(56) References Cited

U.S. PATENT DOCUMENTS

| 8,678,201 B2 | 3/2014 | Hu | |
| 2005/0096250 A1* | 5/2005 | Ohlhausen | C11D 3/3947 510/504 |
| 2005/0266235 A1 | 12/2005 | Masayuki et al. | |
| 2006/0193816 A1* | 8/2006 | Elfersy | A01N 33/12 424/70.28 |
| 2009/0252647 A1* | 10/2009 | Orofino | A61L 2/232 422/28 |

(Continued)

FOREIGN PATENT DOCUMENTS

| CN | 105802293 | 7/2016 | |
| CN | 105802293 A * | 7/2016 | .............. C09D 4/00 |
| EP | 3957626 | 2/2022 | |
| JP | 2001295334 | 10/2001 | |

(Continued)

OTHER PUBLICATIONS

Togawa—JP 2001-295334 A—Euro D3—IDS —MT—antimicrobial coating on faucet—epoxy crosslinkds—remove excess—2001 ( Year: 2001).*

(Continued)

*Primary Examiner* — John Vincent Lawler
(74) *Attorney, Agent, or Firm* — SNELL & WILMER L.L.P.

(57) ABSTRACT

A method of manufacturing a metal component with an anti-microbial molecular layer may comprise: disposing the metal component in a piranha solution; washing the metal component; and grafting a surface of the metal component with a Si-Quat or hybrid Si-Quat molecular layer.

9 Claims, 8 Drawing Sheets

(56) References Cited

U.S. PATENT DOCUMENTS

| | | | | |
|---|---|---|---|---|
| 2010/0028462 | A1* | 2/2010 | Bolkan | A01N 55/00 |
| | | | | 424/717 |
| 2011/0271873 | A1* | 11/2011 | Ohlhausen | A01N 33/12 |
| | | | | 106/287.11 |
| 2012/0125226 | A1* | 5/2012 | Ohlhausen | C11D 1/62 |
| | | | | 556/413 |
| 2014/0051732 | A1 | 2/2014 | Ghannoum et al. | |
| 2016/0295858 | A1 | 10/2016 | Mason et al. | |
| 2020/0068897 | A1* | 3/2020 | Grossman | C09D 5/14 |
| 2020/0352170 | A1* | 11/2020 | Grossman | C09D 179/02 |

FOREIGN PATENT DOCUMENTS

| | | | | |
|---|---|---|---|---|
| JP | 2001295334 A | * | 10/2001 | C23C 28/00 |
| JP | 2007031290 | | 2/2007 | |
| JP | 2011072868 | | 4/2011 | |
| JP | 2011072868 A | * | 4/2011 | B05D 5/00 |
| WO | 2011026093 | | 3/2011 | |

OTHER PUBLICATIONS

Watanabe—JP 2011-072868 A—IDS—MT—Quat-silane coating—fig w—single layer—degrease w—nitric acid—2011 (Year: 2011).*
Wang—CN 105802293 A—Euro D4—MT—cleaning of surfaces—piranha and rinse to remove unreacted silane—2018 (Year: 2018).*
Zhao—microorganisms on aircraft surfaces—risks—Travel Med.& Infect.—2019 (Year: 2019).*
European Patent Office; European Search Report dated May 2, 2022 in Application No. 21215629.3.

* cited by examiner

ANTIMICROBIAL SURFACE TREATMENT SYSTEMS AND METHODS FOR AIRCRAFT FAUCETS

CROSS-REFERENCE TO RELATED APPLICATIONS

This application is a non-provisional of, and claims priority to, and the benefit of U.S. Provisional Application No. 63/127,784, entitled "ANTIMICROBIAL MONOLAYER SURFACE TREATMENT SYSTEMS AND METHODS FOR AIRCRAFT FAUCETS," filed on Dec. 18, 2020, which is hereby incorporated by reference in its entirety for all purposes.

FIELD

The present disclosure relates to antimicrobial surface treatment, in particular, systems and methods of surface treatment for use with aircraft faucets.

BACKGROUND

Mold and contamination of bacteria and virus on faucets, particularly its aerator, can result in water from the faucet failing water bacteria tests and can impact the safety of passengers and crew members flying on aircraft and grounding of aircraft. Mold on faucets may form and combine with bacteria and viruses. The safety of such passengers and crew members may be improved by treating interior and exterior surfaces of faucets—with antimicrobial treatments capable of mitigating the presence of the bacteria, virus and mold on such surfaces. Nano-silver based coatings or surface treatments are widely available and are very effective as anti-microbials as they suppress or inhibit a wide spectrum of bacteria, molds, fungi and viruses. Such coatings, however, are expensive and present significant environmental challenges.

SUMMARY

A method of manufacturing an aircraft metallic faucet with a grafted anti-microbial molecular layer is disclosed herein. The method may comprise: disposing the aircraft metallic faucet in a piranha solution; washing the aircraft metallic faucet; and grafting a surface of the aircraft metallic faucet with a Si-Quat molecular layer or hybrid Si-Quat molecular layer forming a covalent M-O—Si bond, wherein M represents the metal atom of metal substrate of the faucet.

In various embodiments, grafting the surface further comprises soaking the surface in Si-Quat or hybrid Si-Quat solution, and washing away an unreacted portion of the Si-Quat or hybrid Si-Quat solution. The Si-Quat solution may comprise approximately a 1% $(OH)_3$—Si-Quat solution. Washing away the unreacted portion of the Si-Quat solution may further comprise removing the aircraft metallic faucet and washing the aircraft metallic faucet with de-ionized water and acetone. The Si-Quat solution may comprise approximately 1% $(MeO)_3$—Si-Quat with a pH between 2 and 3. Grafting the surface further comprises removing the aircraft metallic faucet and washing the aircraft metallic faucet with MeOH and acetone. The hybrid Si-Quat solution may comprise a weight ratio of Si-Quat:crosslinker alkoxysilanes between 1:1 and 2:1. The Si-Quat may comprises $(MeO)_3$—Si-Quat and the alkoxysilanes comprises R—Si—$(OEt)_3$ (R=Me, EtO, Octyl, perfluorooctyl). The method may further comprise curing the Si-Quat molecular layer or the hybrid Si-Quat molecular layer at a temperature between 60° C. (140° F.) and 100° C. (212° F.). The method may further comprise passivation of the aircraft metallic faucet prior to grafting the aircraft metallic faucet. Passivation of the aircraft metallic faucet may further comprise disposing the aircraft metallic faucet in a nitric acid bath. The aircraft metallic faucet may be a stainless steel component. The Si-Quat or the hybrid Si-Quat molecular layer may be approximately a single quat thick.

An aircraft metallic faucet is disclosed herein. The aircraft metallic faucet may comprise: a surface; and an anti-microbial molecular layer grafted on the surface. The anti-microbial molecular layer may comprise a Si-Quat molecular layer. The anti-microbial molecular layer may comprise a hybrid Si-Quat.

An aircraft faucet system is disclosed herein. The aircraft faucet system may comprise: an aircraft metallic faucet having a surface; and an anti-microbial molecular layer grafted on the surface. The surface may be internal to the aircraft metallic faucet. The aircraft metallic faucet may include an aerator, the aerator including the anti-microbial molecular layer grafted thereon. The anti-microbial molecular layer may comprise a single quat layer.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration.

While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a solenoid valve having a non-sliding plunger assembly. That is, the solenoid valve disclosed herein generally includes a plunger assembly that is moveably suspended within an internal chamber of a housing of the solenoid valve away from any sliding contact with adjacent surfaces. Although details and examples are included herein pertaining to implementing the solenoid valve in a faucet system/manifold for an aircraft lavatory, the present disclosure is not necessarily so limited, and thus aspects of the disclosed embodiments may be adapted for performance in a variety of other industries. As such, numerous applications of the present disclosure may be realized.

The following terms as used in this application are to be defined as stated below and for these terms, the singular includes the plural: $(OH)_3$—Si-Quat: 3-(Trihydroxysilyl) propyldimethyloctadecyl ammonium chloride; $(MeO)_3$—Si-Quat: Octadecyldimethyl(3-trimethoxy silylpropyl)ammonium chloride; and Si-Quat: silyl-containing reactive quaternary ammonium such as $(OH)_3$—Si-Quat or $(MeO)_3$—Si-Quat.

Figure 1:
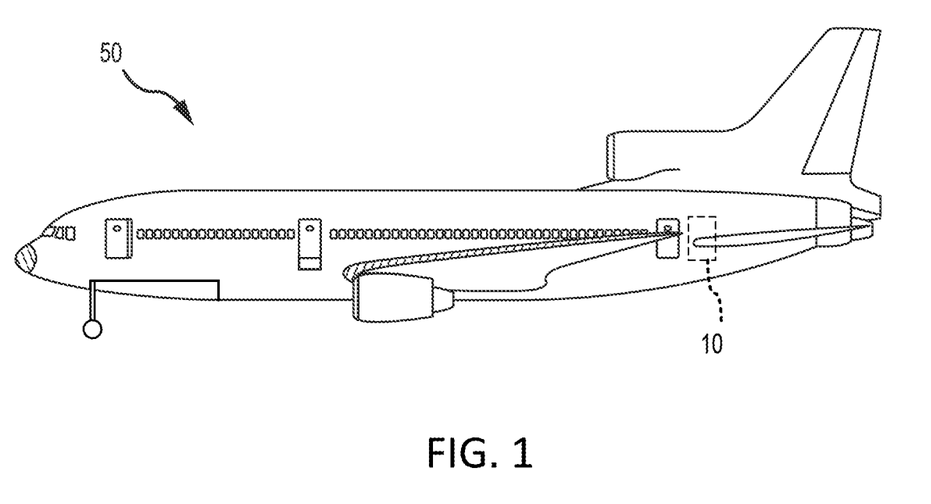
FIG. 1 illustrates an aircraft having a lavatory, in accordance with various embodiments.
Figure 2:
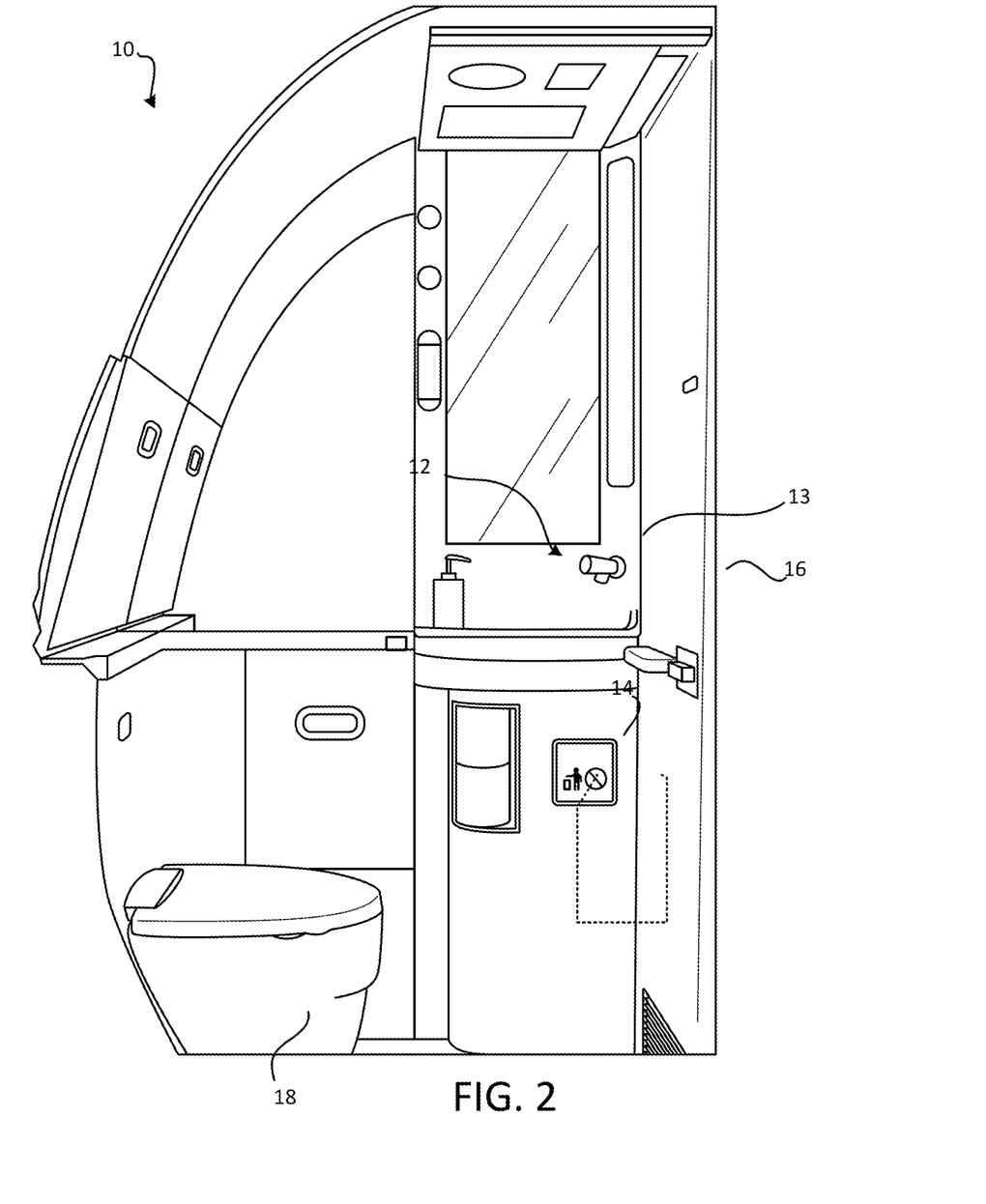
FIG. 2 illustrates a perspective view of an aircraft lavatory, in accordance with various embodiments.

In various embodiments, and with reference to FIGS. 1 and 2, an aircraft 50 may include aircraft lavatory 10. The aircraft lavatory 10 may include a washbasin (e.g., a sink) 12 with a faucet system 13, a trash receptacle 14, a door 16, and a toilet 18, among other features. The faucet system 13 may include a faucet manifold that includes one or more solenoid valves in hot and/or cold water lines, and an aerator 18. The faucet system 13 may include several joints, often around a respective aerator joint. Bacteria and viruses may contaminate an aerator, which may grow the respective pathogen inward to nearby interior walls of the faucet system. In this regard, typical faucet systems may be susceptible to mold growing in or around faucet joints. Thus, the non-antimicrobial surface treatment systems and methods disclosed herein and described in greater detail below may have various health, safety, and aesthetic benefits over conventional faucet systems, according to various embodiments.

Reactive quaternary ammonium ion-based compounds (referred to herein as "-quats") have the ability to react and attach themselves to activated metal surfaces and to form molecular layer films or coatings for long lasting and non-leaching antimicrobial surface treatments. In this disclosure, reactive quats are proposed for antimicrobial molecular layer or coatings for exposed surfaces within an aircraft—e.g., the metallic surfaces of lavatory such as sinks or faucets or similar surfaces that are subject to exposure to bacteria, viruses or pathogens transmitted, for example, by human touch, by airborne means, or by still water. With respect to various embodiments, representative reactive quats is described—a reactive silane quaternary ammonium ion-based antimicrobial (referred to herein as "Si-Quat"). Si-Quat is beneficial for manufacturing a hybrid anti-microbial coating and molecular layer with small silane crosslinkers for high density crosslinking or hydrophobic non-ionic crosslinker with long alkyl chain or fluorocarbon chain for higher contact water angle during manufacturing of aircraft components, such as faucets, or the like. In various embodiments, the increased hydrophobicity (high contact water angle) from hydrophobic crosslinker will enhance non-sticking of bacteria and virus on protected surfaces, and quaternary ammonium from Si-Quat will kill adhered pathogens.

In various embodiments, interior and exterior surfaces of faucets and aerator metal surfaces may be coated or treated with crosslinking networks of Si-Quats. The coating or molecular layer thin film may prevent growth of black mold and may reduce pathogen adhesion and kill pathogen contamination on the aerator and interior and exterior metal surfaces of the faucets, in various embodiments. The hybrid coating and molecular layer thin film may reduce bacteria test failure rate for the water from faucet, in accordance with various embodiments. To increase crosslinking density for hybrid coating robustness, small silane crosslinkers tetra alkoxysilanes, such as $Si(OR)_4$ ($R=CH_3$, $C_2H_5$, $C_3H_7$), or tetraachrosilane $SiCl_4$, or dichloro silane $SiCl_2R_2$, diakoxysilane $Si(OR)_2R'_2$ or $Si(OR)_3R'$ ($R=CH_3$, $C_2H_5$, $R''=CH_3$,) are mixed with a Si-Quat. In various embodiments, hydrophobic crosslinkers $Si(OR')_3R''$ ($R'=CH_3$, $C_2H_5$, $R''=$Octyl, Perfluorooctyl) may be mixed with a Si-Quat for non-sticking of pathogens.

Typical silane quats (Si-Quats) include the following, which are functionalized with reactive alkoxy silane or hydroxylsilane: (i) 1-octadecanaminium, N,N-dimethyl-N-(3-(trimethoxsil)propyl)chloride; (ii) 1-tetradecanaminium, N,N-dimethyl-N-(3-(trimethoxysilyl)propyl)chloride; (iii) 1-decanaminium, Ndidecyl-N-methyl-N-(3-(trimethoxysilyl)propyl)chloride; and (iv) 1-ocatdecananminium, N,N-dimethyl-N-(3-(trihydroxysilyl)propyl)chloride. The last of these reactive Si-Quats, 1-ocatdecananminium, N,N-dimethyl-N-(3-(trihydroxysilyl)propyl)chloride, may be created in situ by combining the first of the reactive quats, 1-octadecanaminium, N,N-dimethyl-N-(3-(trimethoxsil)propyl) chloride, with water. Its representative chemical structure is illustrated in FIG. 3.

In various embodiments, high hydrophobicity of the hybrid coatings and molecular layer disclosed herein from hydrophobic crosslinkers may benefit to reduce pathogen adhesion on the protected surfaces and/or reduce scale build up. The hybrid coatings and molecular layer can be applicable for various metallic surfaces or the like.

Figure 3:
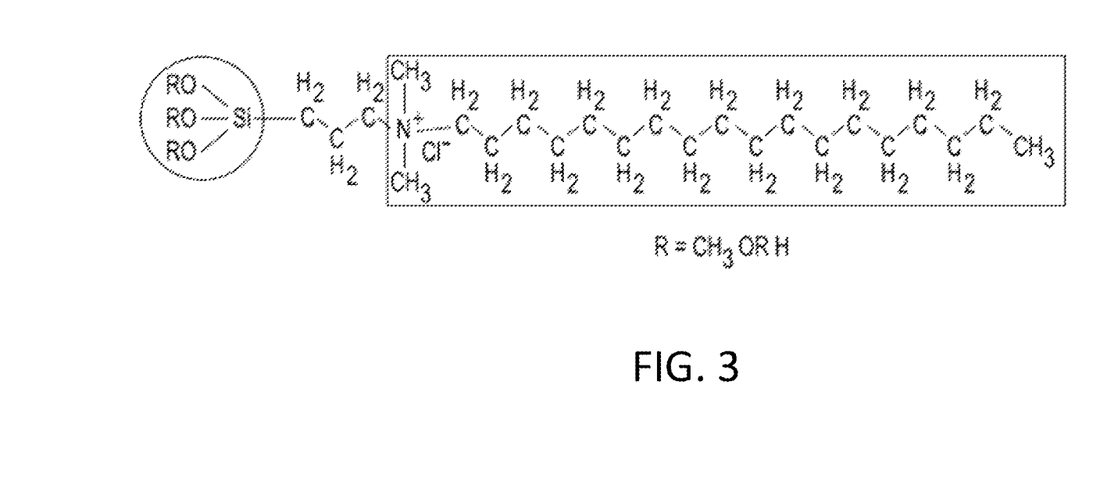
FIG. 3 illustrates a chemical composition for a reactive quat, in accordance with various embodiments.

Referring to FIG. 3, the active ingredient of the compound comprises a quaternary ammonium ion as illustrated in the right-side box of FIG. 3. The positively charged nitrogen atom (N+) attracts negatively charged microbes, which are then destroyed or killed by the Si-Quat. More specifically, the proteins (or the spike proteins) on the outer surface of the SARS-COV-2 virus have been calculated to be negatively charged under neutral pH conditions. Thus, the SARS-COV-2 is electrically attracted to the Si-Quat. When attracted to the Si-Quat, the long molecular carbon or alkyl chain (also referred to as a spike or a sword) comes into contact with the offending microbe or virus. The carbon or alkyl chain then acts like a sword that punctures the outer membrane or coating of the microbe or virus coming in contact with it. For the SARS-COV-2 virus, the hydrophilic envelope surrounding the virus is penetrated by the carbon or alkyl chain, thereby terminating the viability of the virus. Still referring to FIG. 3, the reactive silane or sily group $(RO)_3Si$— ($R=CH_3$ or OH) of the Si-Quat is illustrated in the left-side box. The silane moieties covalently bond to activated metallic surfaces creating either grafted molecular layer or coating with antimicrobial properties. Further, since each silicon atom has three reactive groups, the spare reactive group after bonding to a surface can also bridge to neighboring silicon atoms in the compound, resulting in a robust antimicrobial surface treatment on the surface. A "molecular layer," as described herein, is a layer that is approximately one quat thick (e.g., a quat thick plus or minus 20%), in accordance with various embodiments.

Figure 4A:
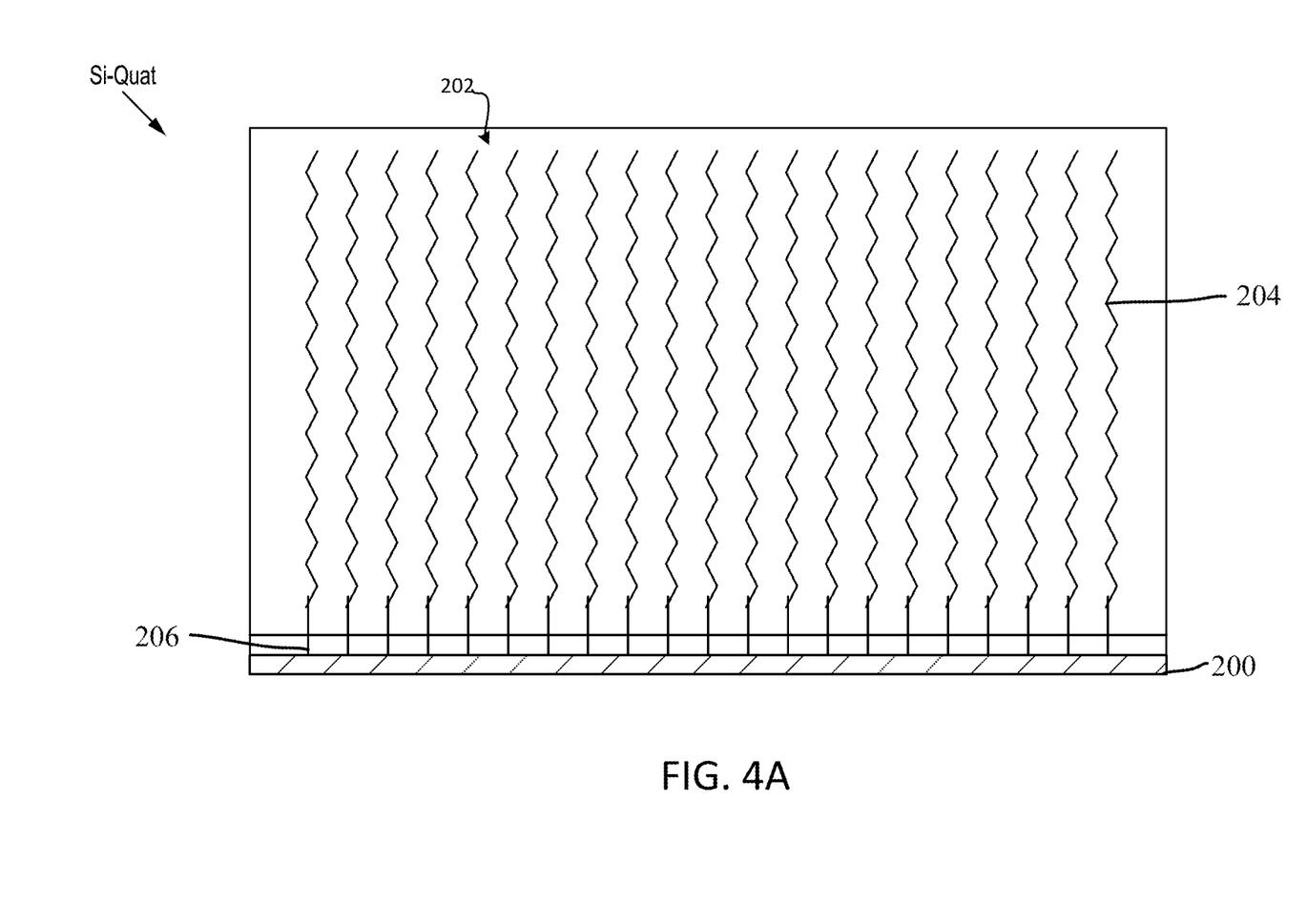
FIG. 4A illustrates a surface portion of a component having a grafted idealized fully covered and fully cross-linked Si-quat molecular layer applied thereon, in accordance with various embodiments.

Referring now to FIG. 4A, a surface 200 having a Si-Quat molecular layer 202 is illustrated. As described above, the Si-Quat molecular layer 202 comprises a plurality of spikes 204 in the form of quaternary ammonium ions having long molecular carbon or alkyl chains, with each spike 204 being attached to the surface 200 via a silane group 206. In various embodiments, the surface 200 may represent an exterior or interior surface of a faucet in faucet system 13 from FIG. 2 (or another faucet surface exposed to water) found on an aircraft, such as, for example, an aerator. Further applicable components on an aircraft include metal handles or the like. In various embodiments, the surface 200 may comprise metals, such as, for example, aluminum, stainless steel or galvanized metal surfaces.

Figure 4B:
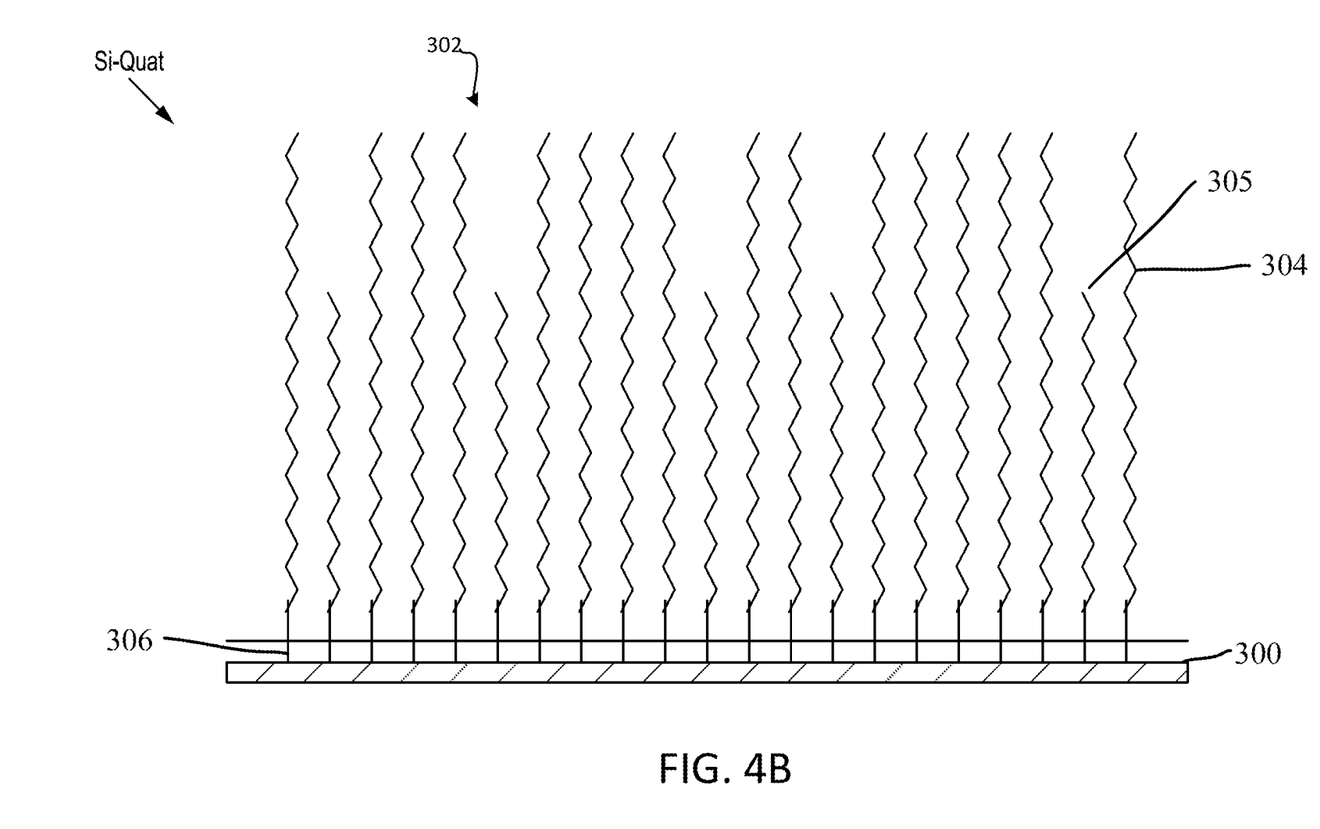
FIG. 4B illustrates a surface portion of a component having a grafted idealized fully covered and fully cross-linked hybrid Si-Quat molecular layer applied thereon, in accordance with various embodiments.

Referring now to FIG. 4B, a surface 300 having a hybrid molecular layer 302 is illustrated. As described above, the hybrid molecular layer 302 comprises a plurality of long spikes 304 in the form of quaternary ammonium ions having long molecular carbon or alkyl chains, with each spike 304 being attached to the surface 300 via a silane group 306. Short spike (305) represents silane crosslinker being attached to the surface 320 via silane group 306 and coupling with a neighboring silicon atom. In various embodiments, short spike 305 has a shorter length relative to long spike 304. In various embodiments, the surface 300 may represent an exterior or interior surface of a faucet in faucet systems 13 from FIG. 2 (or another faucet surface exposed to water) found on an aircraft, such as, for example, an aerator. Further applicable components on an aircraft include metal handles or the like. In various embodiments, the surface 300 may comprise metals, such as, for example, aluminum, stainless steel or galvanized metal surfaces.

Figure 4C:
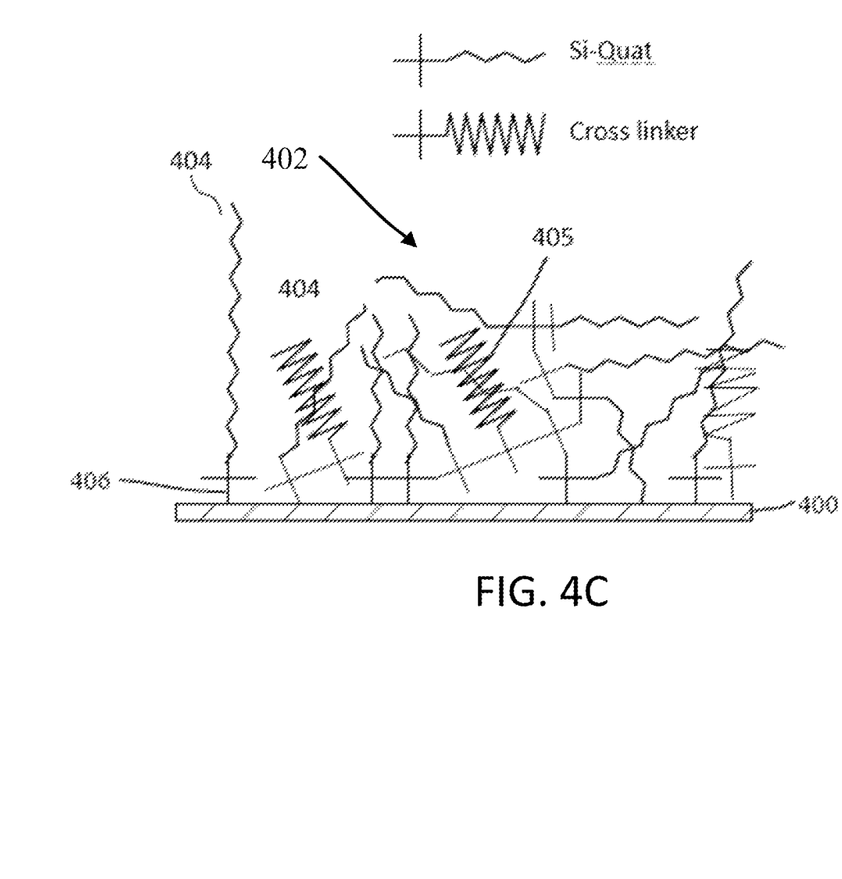
FIG. 4C illustrates a surface portion of a component having a hybrid Si-quat surface coating applied thereon, in accordance with various embodiments.

Referring now to FIG. 4C, a surface 400 having a hybrid coating 402 is illustrated. As described above, the hybrid coating 402 comprises a plurality of spikes or tails 404 (Si-Quat) in the form of quaternary ammonium ions having long molecular carbon or alkyl chains, with each spike or tail 404 being attached to the surface 400 via a silane group 406 or being linked or crosslinked in side of coating off the metal surfaces. The crosslinkers 405 are also being either attached to the surface 400 via a silane group 406 or being linked or crosslinked inside of a coating of the metal surfaces. Small crosslinker may increase cross linker density, while long chain hydrophobic crosslinker may increase the coating hydrophobicity, in accordance with various embodiments. In various embodiments, the surface 400 may represent an exterior or interior surface of a faucet in faucet system 13 from FIG. 2 (or another faucet surface exposed to water) found on an aircraft, such as, for example, an aerator. Further applicable components on an aircraft include metal handles or the like. In various embodiments, the surface 200 may comprise metals, such as, for example, aluminum, stainless steel or galvanized metal surfaces.

Figure 5:
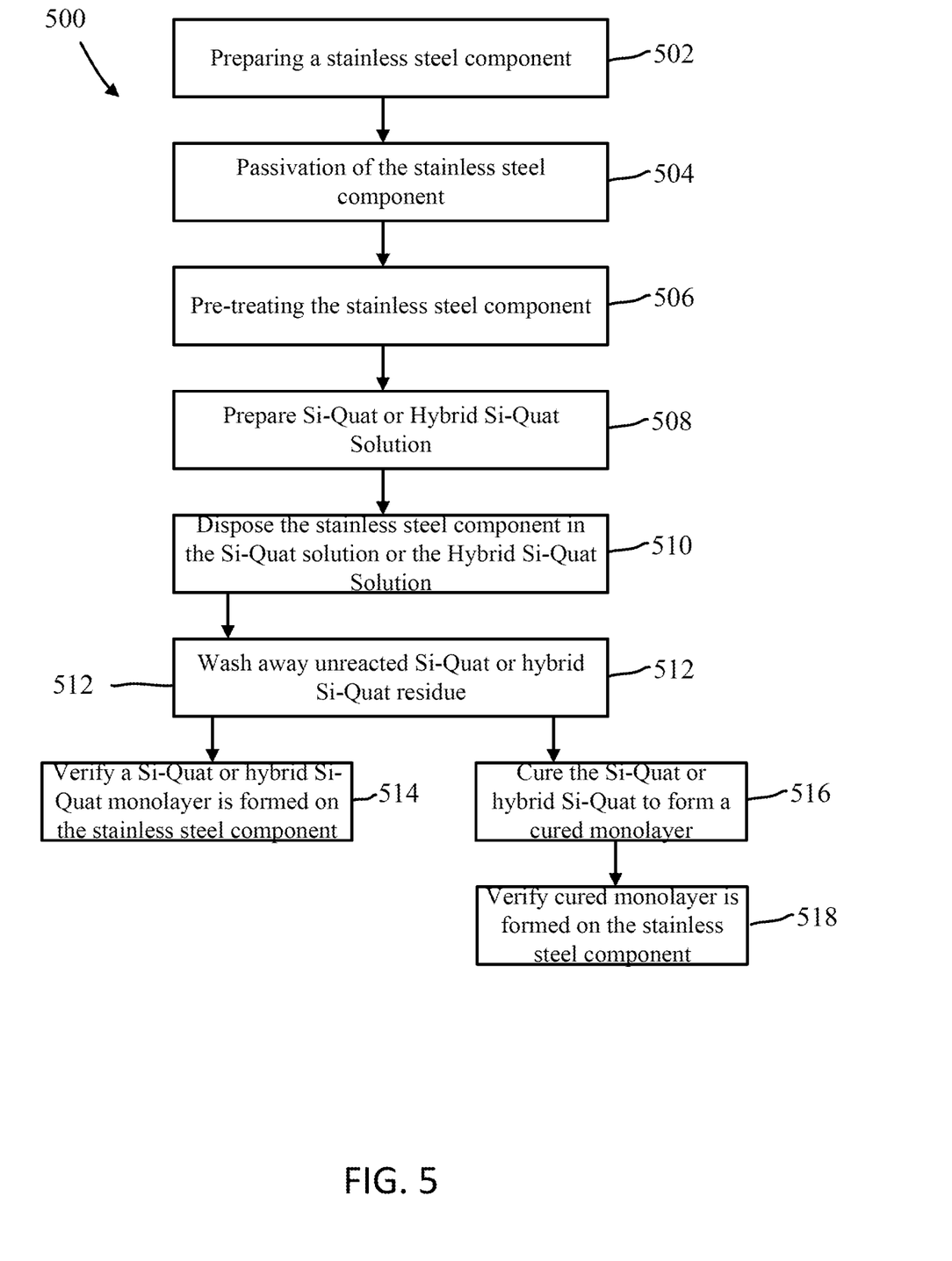
FIG. 5 illustrates a method of manufacturing a stainless steel component with an anti-microbial molecular layer, in accordance with various embodiments.

Referring now to FIG. 5 a method 500 of manufacturing a stainless steel component with an anti-microbial grafted molecular layer is illustrated, in accordance with various embodiments. The method 500 may comprise preparing a stainless steel component for pre-treatment (step 502). In various embodiments, if the stainless steel component includes a protective adhesive film, the protective adhesive film may be removed by any method known in the art. In various embodiments, preparation of the stainless steel component may further comprise soaking the stainless steel component in toluene for between 12 and 48 hours. In various embodiments, preparing the stainless steel component in accordance with step 502 may result in a less corrosive stainless steel component relative to before pretreatment.

In various embodiments, the method 500 may further comprise a passivation process for the stainless steel component (step 504). In various embodiments, the passivation process may be configured to make the stainless steel component more reactive relative to prior to the passivation process. For example, if a surface does not have hydroxy, it may be more difficult to react with a Si-Quat. In various embodiments, the passivation process may comprise preparing a concentrated nitric acid bath (e.g., a 25% nitric acid bath or the like). The stainless steel component may be disposed in the nitric acid bath and heated to between 120° F. and 140° F. (49° C. to 60° C.) for between 20 and 40 minutes, or approximately 30 minutes. In various embodiments, the nitric acid bath is then allowed to return to room temperature, the stainless steel component is removed, and the stainless steel component is washed with three-times de-ionized water, or the like. In various embodiments, a hydroxy group may be increased on a surface of the stainless steel component, in accordance with various embodiments. In this regard, the stainless steel component may include enhances reactivity after step 504.

In various embodiments, the method 500 may further comprise pre-treating the stainless steel component with a piranha treatment (step 506). In various embodiments, the stainless steel component may comprise aircraft grade stainless steel, such as steel conforming to AMS 2700, 304 stainless steel, 316 stainless steel, 304 stainless steel, 904 stainless steel, or the like In various embodiments, the piranha solution is a mixture of sulfuric acid ($H_2SO_4$), water, and hydrogen peroxide ($H_2O_2$). In various embodiments, the piranha solution may include a 70-90% sulfuric acid solution, a 30-35% hydrogen peroxide solution, and water at a ratio of approximately 2:1 mixture of sulfuric acid solution with hydrogen peroxide solution. In various embodiments, the stainless steel component may be disposed in the piranha solution and heated to between 140° F. and 150° F. (60° C. and 65° F.) for approximately ten minutes. In various embodiments, the stainless steel component may then be washed with de-ionized water followed by acetone and allowed to dry. In various embodiments, step 506 may further increase the hydroxy group on the surface of the stainless steel component. In various embodiments, step 506 may increase a hydrophobicity of the surface of the stainless steel component, in accordance with various embodiments. In various embodiments, the heat between 140° F. and 150° F. (60° C. and 65° F.) as outlined above during curing may result in improved condensation and curing of the Si-Quat.

In various embodiments, the method 500 further comprises preparing a Si-Quat solution (step 508). For example, in various embodiments, a 5% $(OH)_3$—Si-Quat may be diluted in water to approximately 2% with de-ionized water to form the Si-Quat solution. In various embodiments, 5% $(OH)_3$ Si-Quat may be commercially available from Gelest Incorporated under the name HM4005 Antimicrobial.

In various embodiments, the method 500 further comprises treating the stainless steel component with the Si-Quat solution (step 510). The molecular layer may be performed by any method, such as soaking in the Si-Quat containing solutions.

In various embodiments, the method 500 further comprises removing the stainless steel component from the Si-Quat solution and washing the stainless steel component (step 512). In various embodiments, a stainless steel component removed from the 1% (OH)$_3$ Si-Quat solution may be washed with de-ionized water and acetone. In various embodiments, a stainless steel component removed from the 1% (OH)$_3$—Si-Quat solution may be washed with di-ionized water and acetone.

In various embodiments, the method 500 further comprises preparing a hybrid Si-Quat solution (step 508), i.e. Si-Quat with small silane crosslinkers or long chain hydrophobic crosslinkers. For example, in various embodiments, a 72% (MeO)$_3$—Si-Quat solution may be diluted in MeOH to approximately 1% and adjusted to a pH between 2 and 3 by using HCl dilute in de-ionized water to form the Si-Quat solution and mixed with alkoxysilane, such as R—Si—(OEt)$_3$ (R=Me, EtO, Octyl, perfluorooctyl) to form a hybrid Si-Quat solution with crosslinkers. In various embodiments, a 72% (MeO)$_3$—Si-Quat may be commercially available from Gelest Incorporated under the name HM4072 Antimicrobial. Similarly, tetraethoxysilane, octyltriethoxysilane, and methyltriethoxysilane may be commercially available from Gelest Incorporated. In various embodiments, a weight ratio between the (MeO)$_3$—Si-Quat to alkoxysilane may be between 1:1 and 1:2, in accordance with various embodiments.

In various embodiments, the Si-Quat or hybrid Si-Quat may be grafted to the surface of the stainless steel component in response to steps 506, 508, 510, 512. "Grafted," as disclosed herein refers to growing or joining together (e.g., via covalent bonding).

In various embodiments, the method 500 may further comprise verifying the Si-Quat molecular layer has been grafted on the surface of the stainless steel component (step 514). In various embodiments, the Si-Quat molecular layer may be verified by any method known in the art.

In various embodiments, the method 500 may comprise curing the Si-Quat or hybrid —Si Quat on the stainless steel component (step 516) after washing away the unreacted Si-Quat or hybrid residue in step 512. In various embodiments, curing the Si-Quat or hybrid Si-Quat on the stainless steel component at higher temperatures results in treated surfaces with a greater hydrophobicity and more robust molecular layer in step 516. In various embodiments, the Si-Quat or hybrid Si-Quat molecular layer may be cured at a temperature between 60° C. (140° F.) and 100° C. (212° F.).

In various embodiments, the method 500 may further comprise verifying the Si-Quat or hybrid Si-Quat molecular layer has been formed in step 516 on the surface of the stainless steel component (step 518). In various embodiments, the Si-Quat treated surfaces may be verified by any method known in the art, such as analyzing bacteria reduction efficiency.

TABLE 1

Antimicrobial tests of hydroyl -activated Stainless steel plates covalent-bonded with molecular layer 3-(Trihydroxysilyl)propyldimethyloctadecyl ammoniumchloride

| Stainless Steel Substrates | Surface hydroxyl activation | Grafting Si-Quat | E-Coli reduction test Per JIS Z 2801:2010 in comparison with SS substrate control |
|---|---|---|---|
| SS316 bead blasted - McMaster 88885K24, blasted, nitric acid Passivated | piranha treated | soaked in HM4005* (diluted to 2.5%) overnight, rinsed off excess HM4005, cured at oven 85 C. (185 F.) 24 hours | 97% |
| SS316 brushed - McMaster 9745K74, nitric acid passivated | piranha treated | soaked into HM4005* (diluted to 2.5%) overnight, rinsed off excess HM4005, cured at oven 85 C. (185 F.) 24 hours | 95% |
| SS304 brushed - McMaster 9748K24, nitric acid passivated | piranha treated | soaked into HM4005* (diluted to 2.5%) overnight, rinsed off excess HM4005, cured at oven 85 C. (185 F.) 24 hours | 96% |

Figure 6:
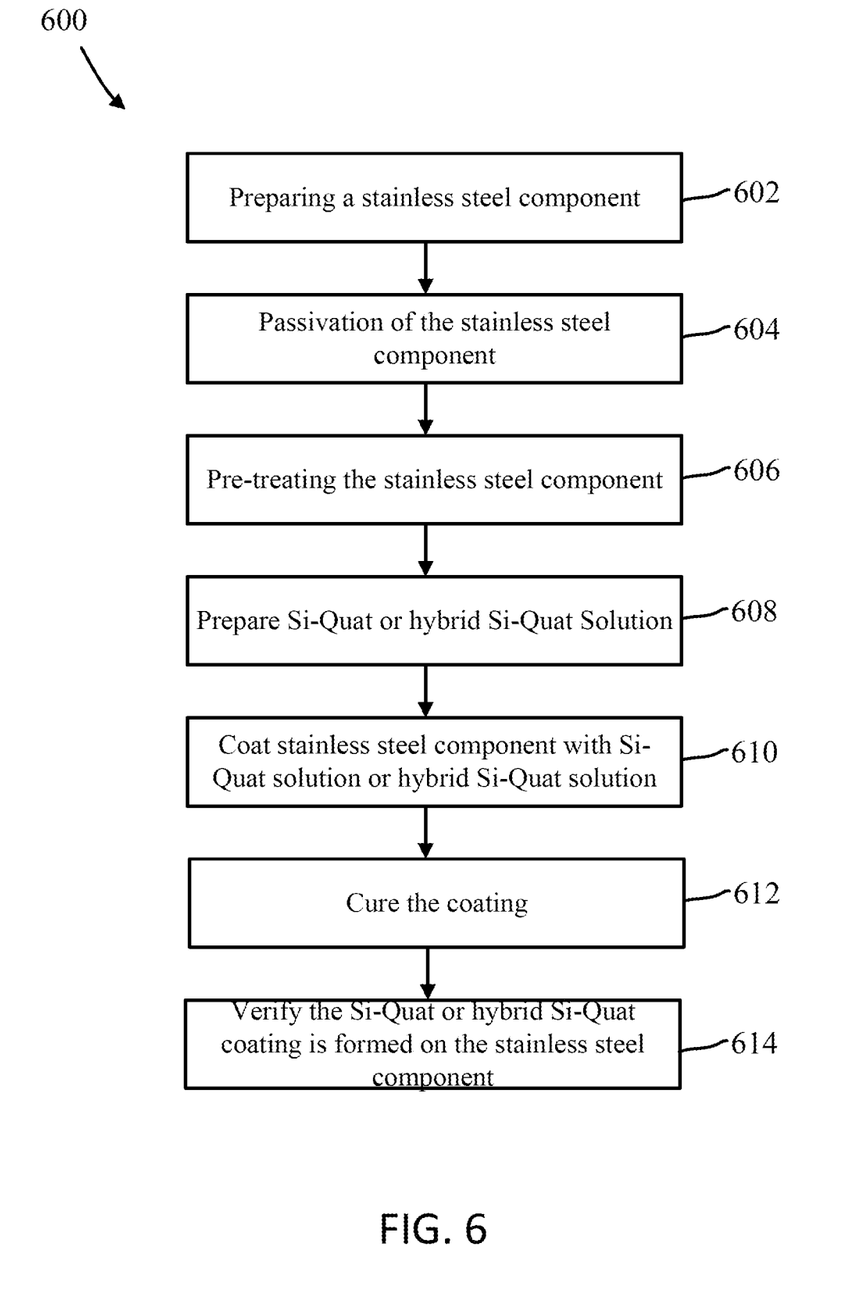
FIG. 6 illustrates a method of manufacturing a stainless steel component with an anti-microbial coating with/without additional crosslinkers.

*Gelest HM 4005: 3-(Trihydroxysilyl)propyldimethyloctadecyl ammoniumchloride, 5% aqueous solution Referring now to FIG. 6, a method 600 of manufacturing a stainless steel component with a Si-Quat or a hybrid Si-Quat anti-microbial coating with silane crosslinkers is illustrated, in accordance with various embodiments. The method 600 may comprise preparing a stainless steel component for pre-treatment (step 602). In various embodiments, if the stainless steel component includes a protective adhesive film, the protective adhesive film may be removed by any method known in the art. In various embodiments, preparation of the stainless steel component may further comprise soaking the stainless steel component in toluene for between 12 and 48 hours. In various embodiments, preparing the stainless steel component in accordance with step 602 may result in a less corrosive stainless steel component relative to before pre-treatment.

In various embodiments, the method 600 may further comprise a passivation process for the stainless steel component (step 604). In various embodiments, the passivation process may be configured to make the stainless steel component more reactive relative to prior to the passivation process. For example, if a surface does not have enough hydroxy, it may be more difficult to react with a Si-Quat or hybrid Si-Quat. In various embodiments, the passivation process may comprise preparing a concentrated nitric acid bath (e.g., a 25% nitric acid bath or the like). The stainless steel component may be disposed in the nitric acid bath and heated to between 120° F. and 140° F. (49° C. to 60° C.) for between 20 and 40 minutes, or approximately 30 minutes. In various embodiments, the nitric acid bath is then allowed to return to room temperature, the stainless steel component is removed, and the stainless steel component is washed with three-times de-ionized water, or the like. In various embodiments, a hydroxy group may be increased on a surface of the stainless steel component, in accordance with various embodiments. In this regard, the stainless steel component may include enhances reactivity after step 604.

In various embodiments, the method 600 may further comprise pre-treating the stainless steel component with a piranha treatment (step 606). In various embodiments, the piranha solution is a mixture of concentrated sulfuric acid ($H_2SO_4$), water, and concentrated hydrogen peroxide ($H_2O_2$). In various embodiments, the piranha solution may include a 70-90% sulfuric acid solution, a 30-35% hydrogen peroxide solution, and water at a ratio of approximately 2:1 mixture of the concentrated sulfuric solution with the concentrated hydrogen peroxide. In various embodiments, the stainless steel component may be disposed in the piranha solution and heated to between 140° F. and 150° F. (60° C. and 65° C.) for approximately ten minutes. In various embodiments, the stainless steel component may then be washed with de-ionized water followed by acetone and allowed to dry. In various embodiments, step 606 may further increase the hydroxy group on the surface of the stainless steel component. In various embodiments, step 606 may increase a hydrophobicity of the surface of the stainless steel component, in accordance with various embodiments. In various embodiments, the heat between 140° F. and 150° F. (60° C. and 65° C.) as outlined above during curing may result in improved condensation and curing of the Si-Quat and hybrid Si-Quat coating. In various embodiments, in step 606, after piranha treatment, the stainless steel can further soak in SIT7110.0 from Gelest, Inc., TETRAETHOXYSILANE, oligomeric hydrolysate liquid overnight, then rinse with acetone and dry in oven at 85° C. for 24 hours to modify the surfaces with reactive —Si(OEt) or Si(OH) to be covalently grafted with Si-Quat in Step 608. This step may improve retention of Si-Quat or hybrid Si-Quat coating solution on the steep stainless steel surfaces.

In various embodiments, the method 600 further comprises preparing a hybrid Si-Quat solution with crosslinkers (step 608). For example, in various embodiments, a 72% $(MeO)_3$—Si-Quat solution may be diluted in MeOH to approximately 1% and adjusted to a pH between 2 and 3 by using HCl dilute in de-ionized water to form the Si-Quat solution and mixed with alkoxysilane, such as R—Si—$(OEt)_3$ (R=Me, EtO, Octyl, perfluorooctyl) to form a hybrid Si-Quat solution with crosslinkers. In various embodiments, a 72% $(MeO)_3$—Si-Quat may be commercially available from Gelest Incorporated under the name HM4072 Antimicrobial. Similarly, tetraethoxysilane, octyltriethoxysilane, and methyltriethoxysilane may be commercially available from Gelest Incorporated. In various embodiments, a weight ratio between the $(MeO)_3$—Si-Quat to alkoxysilane may be between 1:1 and 1:2, in accordance with various embodiments.

In various embodiments, the method further comprises coating the stainless steel component with the hybrid Si-Quat solution with crosslinkers (step 610). The hybrid coating may be performed by any method, such as drop casting, spin coating, dip coating, spray coating, Langmuir-Blodgett deposition, substrate/particle surface functionalization, or the like. In various embodiments, the coating may be performed by drop casting.

In various embodiments, the method 600 may comprise curing the hybrid Si-Quat coating with crosslinkers on the stainless steel component (step 612). In various embodiments, curing the hybrid coating on the stainless steel component at higher temperatures with a ratio of Si-Quat: Alkoxysilanes between 1:1 and 1:2 results in a coating with a greater hydrophobicity for the coating. For example, a table of contact angles of stainless steel coated with various ratios of Si-Quat:R—Si—$(OEt)_3$ is illustrated.

TABLE 1

Contact angle of stainless steel coated with various ratios of Si-Quat:R-Si—$(OEt)_3$

| Ratio $(MeO)_3$—Si-Quat:R-Si—$(OEt)_3$ | Before Cure (RT for 1 day) | | | After Cure (80° C.) for 24 hours | | |
| --- | --- | --- | --- | --- | --- | --- |
| | R = OEt | R = Me | R = Octyl | R = OEt | R = Me | R = Octyl |
| 1:1 | 90 | 80 | 90->45 | 90 | 92 | 101 |
| 2:1 | 92 | 82 | 90->48 | 89 | 94 | 106 |

As indicated above, for R=Octyl, the water contact angle reduced as the water wetted the coating, which is likely due to residual in the alkoxy groups. For example, a 1:1 of Si-Quat:Octyl-Si$(OEt)_3$ had an initial contact angle of 90 degrees then reduced to 45 degrees as the water wetted the surface. Upon curing at 80° C. (176° F.), the contact angle increased for R=Me, Octyl, indicating more condensation between the alkoxy groups. In various embodiments, a greater contact angle refers to a greater hydrophobicity, which may result in less water accumulating on a stainless steel surface coated with the hybrid Si-Quat coating. Thus, a faucet having the hybrid Si-Quat coating may have significantly less water accumulation during use by having a hybrid Si-Quat coating disclosed herein relative to typical faucets for use in aircraft faucet systems, in accordance with various embodiments.

In various embodiments, the method 600 may further comprise verifying the hybrid Si-Quat coating has been formed on the surface of the stainless steel component (step 614). In various embodiments, the hybrid Si-Quat coating may be verified by any method known in the art, such as bacteria reduction tests.

Antimicrobial tests of Si—OH/Si—OEt activated stainless steel plates covalent-bonded with coating 3-(Trihydroxysilyl)propyldimethyloctadecyl ammoniumchloride

| Stainless Steel Substrates | Surface Si—OH/ Si—OEt activation | Grafting Si-Quat coating | E-Coli reduction test Per JIS Z 2801:2010 in comparison with SS substrate control |
|---|---|---|---|
| SS316 bead blasted - McMaster 88885K24, blasted, nitric acid Passivated | piranha treated, followed by soaking in SIT7110.0 † overnight, heated at oven 85° C. (185 F.°) 24 hours | soaked in HM4005* (diluted to 2.5%) 2 days, cured at 85° C. (185° F.) for 48 hours | 99.99995% |
| ZSS316 brushed - McMaster 9745K74, nitric acid passivated | piranha treated, followed by soaking in SIT7110.0-3KG* overnight, heated at oven 85° C. (185 F.°) 24 hours | soaked in HM4005* (diluted to 2.5%) 2 days, cured at 85° C. (185° F.) for 48 hours | 99.998% |
| SS304 brushed - McMaster 9748K24, nitric acid passivated | piranha treated, followed by soaking in SIT7110.0-3KG* overnight, heated at oven 85° C. (185 F.°) 24 hours | soaked in HM4005* (diluted to 2.5%) 2 days, cured at 85° C. (185° F.) for 48 hours | 99.99994% |

*Gelest HM 4005: 3-(Trihydroxysilyl)propyldimethyloctadecyl ammoniumchloride, 5% aqueous solution; † Gelest SIT7110.0: TETRAETHOXYSILANE, oligomeric hydrolysate Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing an aircraft metallic faucet with a grafted anti-microbial molecular layer, the method comprising:
   disposing the aircraft metallic faucet in a piranha solution;
   washing the aircraft metallic faucet; and
   grafting a surface of the aircraft metallic faucet with a reactive silane quaternary ammonium ion-based ("Si-Quat") molecular layer comprising forming a covalent M-O—Si bond, wherein M represents a metal atom of a metal substrate of the aircraft metallic faucet, wherein the Si-Quat molecular layer is a single quat thick, wherein:
      the grafting the surface further comprises soaking the surface in a Si-Quat solution, and washing away an unreacted portion of the Si-Quat solution, and
      the Si-Quat solution comprises approximately 1% $(MeO)_3$—Si-Quat with a pH between 2 and 3.

2. The method of claim 1, wherein the grafting the surface further comprises removing the aircraft metallic faucet and washing the aircraft metallic faucet with MeOH and acetone.

3. The method of claim 1, further comprising curing the Si-Quat molecular layer at a temperature between 60° C. (140° F.) and 100° C. (212° F.).

4. The method of claim 1, further comprising performing a passivation process on the aircraft metallic faucet prior to grafting the aircraft metallic faucet.

5. The method of claim 4, wherein the performing the passivation process on the aircraft metallic faucet further comprises disposing the aircraft metallic faucet in a nitric acid bath.

6. The method of claim 1, wherein the aircraft metallic faucet is a stainless steel component.

7. A method of manufacturing an aircraft metallic faucet with a grafted anti-microbial molecular layer, the method comprising:
   disposing the aircraft metallic faucet in a piranha solution;
   washing the aircraft metallic faucet; and
   grafting a surface of the aircraft metallic faucet with a reactive silane quaternary ammonium ion-based ("Si-Quat") molecular layer comprising forming a covalent M-O—Si bond, wherein M represents a metal atom of a metal substrate of the aircraft metallic faucet, wherein the Si-Quat molecular layer is a single quat thick, wherein:
      the grafting the surface further comprises soaking the surface in a Si-Quat solution, and washing away an unreacted portion of the Si-Quat solution,
      the Si-Quat solution comprises approximately a 1% $(OH)_3$—Si-Quat solution, and
      the washing away the unreacted portion of the Si-Quat solution further comprises removing the aircraft metallic faucet and washing the aircraft metallic faucet with de-ionized water and acetone.

8. A method of manufacturing an aircraft metallic faucet with a grafted anti-microbial molecular layer, the method comprising:
   disposing the aircraft metallic faucet in a piranha solution;
   washing the aircraft metallic faucet; and
   grafting a surface of the aircraft metallic faucet with a hybrid reactive silane quaternary ammonium ion-based antimicrobial ("Si-Quat") molecular layer comprising forming a covalent M-O—Si bond, wherein:
      M represents a metal atom of a metal substrate of the aircraft metallic faucet, wherein the hybrid Si-Quat molecular layer is a single quat thick, wherein:
      the grafting the surface further comprises soaking the surface in a hybrid Si-Quat solution, and washing away an unreacted portion of the hybrid Si-Quat solution, and
      the hybrid Si-Quat solution comprises a weight ratio of Si-Quat:crosslinker alkoxysilanes between 1:1 and 2:1.

9. The method of claim 8, wherein the hybrid Si-Quat solution comprises $(MeO)_3$—Si-Quat and the crosslinker alkoxysilanes comprises R—Si—$(OEt)_3$ (R=Me, EtO, Octyl, perfluorooctyl).

* * * * *